United States Patent [19]
Johnston et al.

[11] Patent Number: 5,404,747
[45] Date of Patent: Apr. 11, 1995

[54] PORTABLE VACUUM TEST TOOL FOR DETECTION OF LEAKS IN SEALED GAPS

[75] Inventors: Michael T. Johnston, Des Moines; Michael P. Petro, Lake Stevens; Leslie E. Turner, Snohomish, all of Wash.

[73] Assignee: The Boeing Company, Seattle, Wash.

[21] Appl. No.: 973,489

[22] Filed: Nov. 9, 1992

[51] Int. Cl.6 ............................................. G01M 3/24
[52] U.S. Cl. ...................... 73/40; 73/40.5 A; 73/591; 73/592
[58] Field of Search ............... 73/40, 40.5 A, 49.3, 73/49.2, 52, 592, 591

[56] References Cited

U.S. PATENT DOCUMENTS

| | | | |
|---|---|---|---|
| 2,108,176 | 2/1938 | Newby | 73/40 |
| 2,345,387 | 3/1944 | Elsey | 73/40 |
| 2,647,399 | 8/1953 | Newbill | 73/40 |
| 2,660,053 | 11/1953 | Buehner | 73/40 |
| 3,266,296 | 8/1966 | Hall | 73/40.5 A |
| 3,524,342 | 8/1970 | Habbs | 73/40 |
| 3,555,884 | 1/1971 | Yamamoto et al. | 73/40.7 |
| 3,945,172 | 3/1976 | Johnson | 53/112 A |
| 4,002,055 | 1/1977 | Kops | 73/40 |
| 4,114,424 | 9/1978 | Johnson | 73/40 |
| 4,202,201 | 5/1980 | Johnson | 73/40 |
| 4,809,538 | 3/1989 | Fisch | 73/40.5 A |
| 4,839,280 | 6/1989 | Bones | 435/285 |
| 4,991,426 | 2/1991 | Evans | 73/592 |
| 5,073,482 | 12/1991 | Goldstein | 73/40 |
| 5,117,676 | 6/1992 | Chang | 73/592 |

FOREIGN PATENT DOCUMENTS

| | | | |
|---|---|---|---|
| 2664054 | 1/1992 | France | 73/40.5 A |
| 4042031 | 2/1992 | Japan | 73/40.5 A |
| 1568968 | 6/1980 | United Kingdom | 73/40.5 A |

OTHER PUBLICATIONS

The Pressure Cabin, Paul Sevin, Inter Avia vol. VI, No. 1, 1951.
*Webster's Third New International Dictionary of the English Language Unabridged*, P. B. Gove ed., 1964, pp. 730 and 2554.

Primary Examiner—Hezron E. Williams
Assistant Examiner—Daniel S. Larkin
Attorney, Agent, or Firm—Elizabeth F. Harasek

[57] ABSTRACT

A portable testing apparatus to detect air leaks across large sealed gaps comprising an elastomeric, air impervious sheet sized and shaped to overlap a gap between an opening in a structure and an insert, a vacuum plenum extending through and sealing with said sheet, means for attaching the plenum to a vacuum source, channels, with openings therein for uniformly distributing and drawing a vacuum between a sheet and the structure, extending from the plenum along the inside surface of said sheet. The testing apparatus also comprising means for detecting the passage of air through the sealed gap when a vacuum is drawn therethrough.

9 Claims, 4 Drawing Sheets

PORTABLE VACUUM TEST TOOL FOR DETECTION OF LEAKS IN SEALED GAPS

BACKGROUND OF THE INVENTION

The present invention relates to a device for testing seals, and more specifically to a vacuum test tool to detect leaks in sealed gaps.

Often structures that are subject to internal or external pressurization have areas susceptible to defects that result in unacceptable pressure disturbances. For example, the gaps around aircraft doors, windows, hatches, or other inserts must be completely sealed to maintain adequate pressurization of the passenger cabin. Early detection of a pressure leak during the manufacture or maintenance of a structure is desired to avoid downstream corrections that generally require additional time, expense, and labor. It is also desirable to routinely and easily test for leaks during scheduled maintenance.

Seals around aircraft doors and hatches have typically been installed early in the production cycle. However, the adequacy of the seal could be first tested only during a "full blow" test wherein the entire fuselage is pressurized to in-flight conditions. "Full blow" occurred only after the fuselage was capable of being pressurized; typically very late in the production cycle after doors, windows, hatches and their respective seals and decorative trim had all been installed. Therefore, discovery of defective seals or seams during "full blow" required substantial rework to dismantle portions of the aircraft to fix or replace the defective seal.

Vacuum force has been used to detect air leaks in a section of a seam as demonstrated in U.S. Pat. Nos. 2,108,176, 2,660,053, and 4,002,055. These patents teach detection of leaks by placing a windowed vacuum chamber over part of a seam that has been coated with a soapy film. Application of a vacuum force draws air through leaks in the seam, thereby forming soap bubbles along the leaking area. This leak detection method is labor intensive not practical for testing seals in areas where soap bubbles are difficult to see, such as along seals recessed in gaps around aircraft doors, windows, hatches, etc.

These patents also teach the use of a fairly small vacuum chamber with a narrow perimeter seal to maintain suction. The resulting load on the structure surrounding the seam is concentrated along the narrow perimeter area. Applying the same vacuum chamber concept to larger area, such as around a door, window, hatch, etc., puts a substantial load on the surrounding structure. These large pressure loads may result in damage to the surrounding structure and thus unacceptable. Accordingly, for leak testing large cut-out areas it is desired to spread vacuum loads over the entire surface to prevent excess loading on the aircraft structure under the test equipment.

It is therefore a principal object of the present invention to provide a testing apparatus that allows a user to quickly, efficiently and reliably test a seal or seam in for unwanted leaks without potential damage to the structure being tested. It is also an important goal to do such leak testing early in the production cycle while any leakage is relatively easy to repair.

SUMMARY OF THE INVENTION

A preferred embodiment of the testing apparatus of the present invention comprises a seal sheet and a vacuum plenum adhered to the inside surface of the sheet incorporating a vacuum plenum. The seal sheet comprises an air impervious elastomeric material with a shape and size to overlap a gap to be tested. The plenum comprises a vacuum inlet nozzle connected to a vacuum source. The plenum also has vacuum distribution means, such as channels or tubes, branching from the vacuum source or plenum so a vacuum is pulled substantially uniformly at desired locations beneath the seal sheet.

Unwanted leaks in a gap or seam are detected by placing the elastomeric seal sheet over the gap. The seal sheet is installed so that the vacuum plenum is located between the seal sheet and the periphery of the gap in the structure. When a vacuum is drawn through the plenum and vacuum distribution means, a vacuum is created under the entire seal sheet holding it in place without need for additional adhesive or clamping means. The vacuum pulls air through any leaks in the gap or seam being tested.

Leak detection means such as a listening tube or ultrasonic tester are used to detect the sound made by the air being pulled through a leak.

The above and other advantages of the present invention will be more clearly understood from the detailed description of the preferred embodiment that follows when taken in conjunction with the features shown in attached drawings.

DETAILED DESCRIPTION OF THE PREFERRED EMBODIMENT

Figure 1:
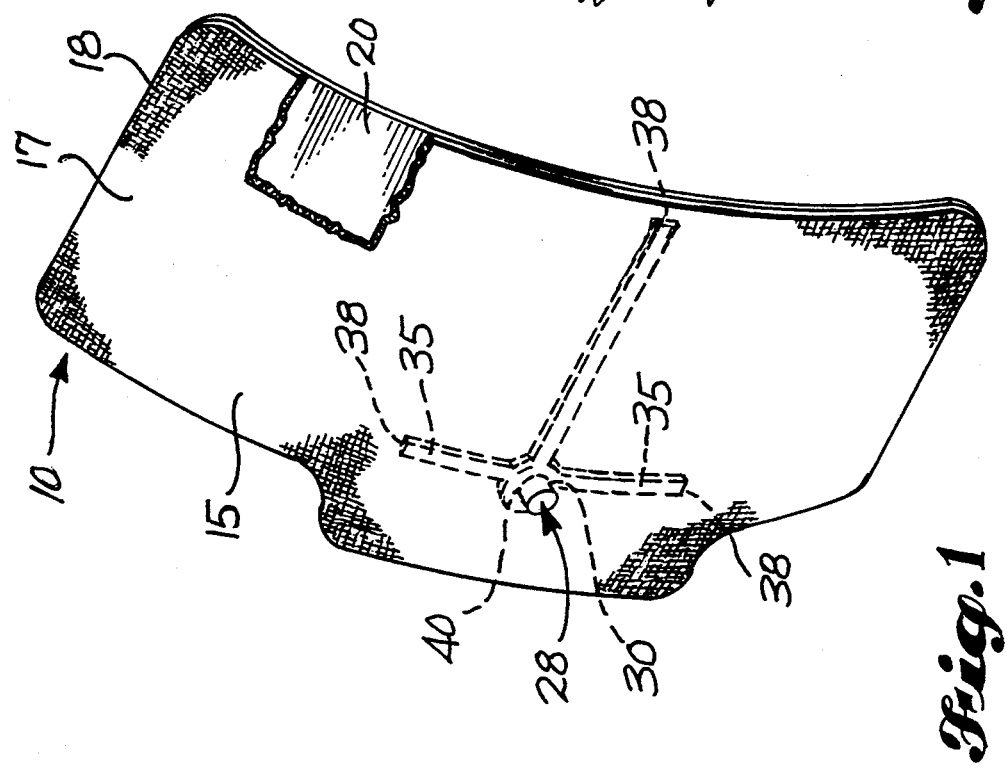
FIG. 1 is an isometric view of a vacuum seal sheet and adhered vacuum plenum.

As seen in FIG. 1, a vacuum test tool 10 comprises a seal sheet 15 of air impervious, elastomeric material. The sheet 15 has an outside surface 17 and an inside surface 20, wherein the inside surface 20 directly interfaces and seals with the surface of the vessel or fuselage and the associated gap or seam being tested. In the preferred embodiment, sheet 15 is a flexible closed cell foam rubber, such as neoprene, which has an adhered nylon fabric layer 18 on outside surface 17. Layer 18 provides additional strength to and helps prevent damage of sheet 15.

A vacuum plenum 25 is adhered with adhesive means to the inside surface 20 of sheet 15 such that vacuum plenum 25 may interface with a predetermined sealed gap. Plenum 25 has a vacuum inlet area 28 and attachment means 30 to which the vacuum source connection hose (not shown) attaches. Vacuum distribution channels or tubes 35 extend radially outward from vacuum inlet area 28. In the preferred embodiment, plenum 25 is a flexible molded rubber unit and channels 35 have an opening such as a slit or perforations extending along the length of a channel 35 to evenly and adequately distribute the vacuum force. End 38 of distribution means 35 may be closed off thereby localizing the vacuum force drawing air or gas out of the desired location such as a gap or seal. Attachment means 30 extends from inside surface 20 through a properly sized opening 40 in the seal sheet 15. An appropriate bond between plenum 25 and sheet 15 in the area around opening 40 prevents undesired loss of vacuum force.

Figure 2:
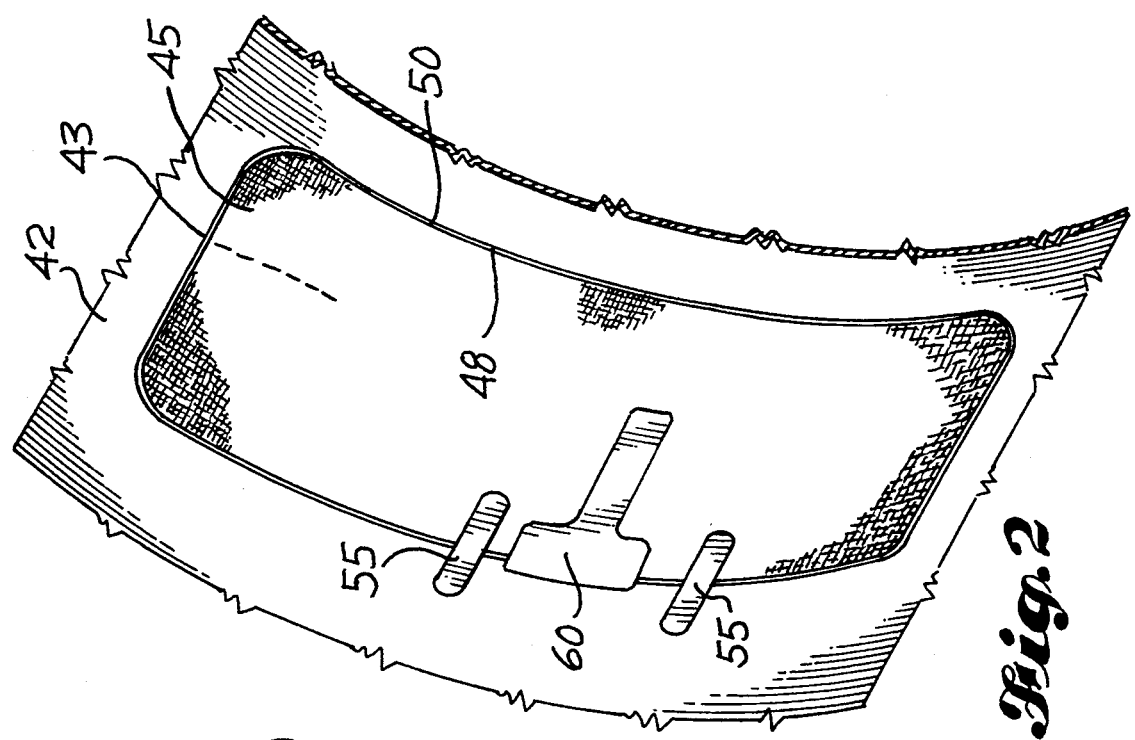
FIG. 2 is an isometric view of a pressure vessel section containing a door and a surrounding sealed gap.

Referring to FIG. 2, a convexly curved planar structure 42, such as an aircraft fuselage or other vessel subject to pressurization, has an opening 43 in which an insert 45 such as a door, hatch, window, etc. is installed. The interface between the edge 48 of insert 45 and opening 43 creates gap or seam 50. A seal (not shown) is usually installed along gap 50 to prevent leakage and pressure loss resulting from pressure disturbance or air flow through the gap 50. In an aircraft door situation, gap 50 includes hinge cut out areas 55 and a door opening mechanism area 60. These areas and other openings must be adequately sealed to obtain and maintain a pressurized fuselage.

Figure 3:
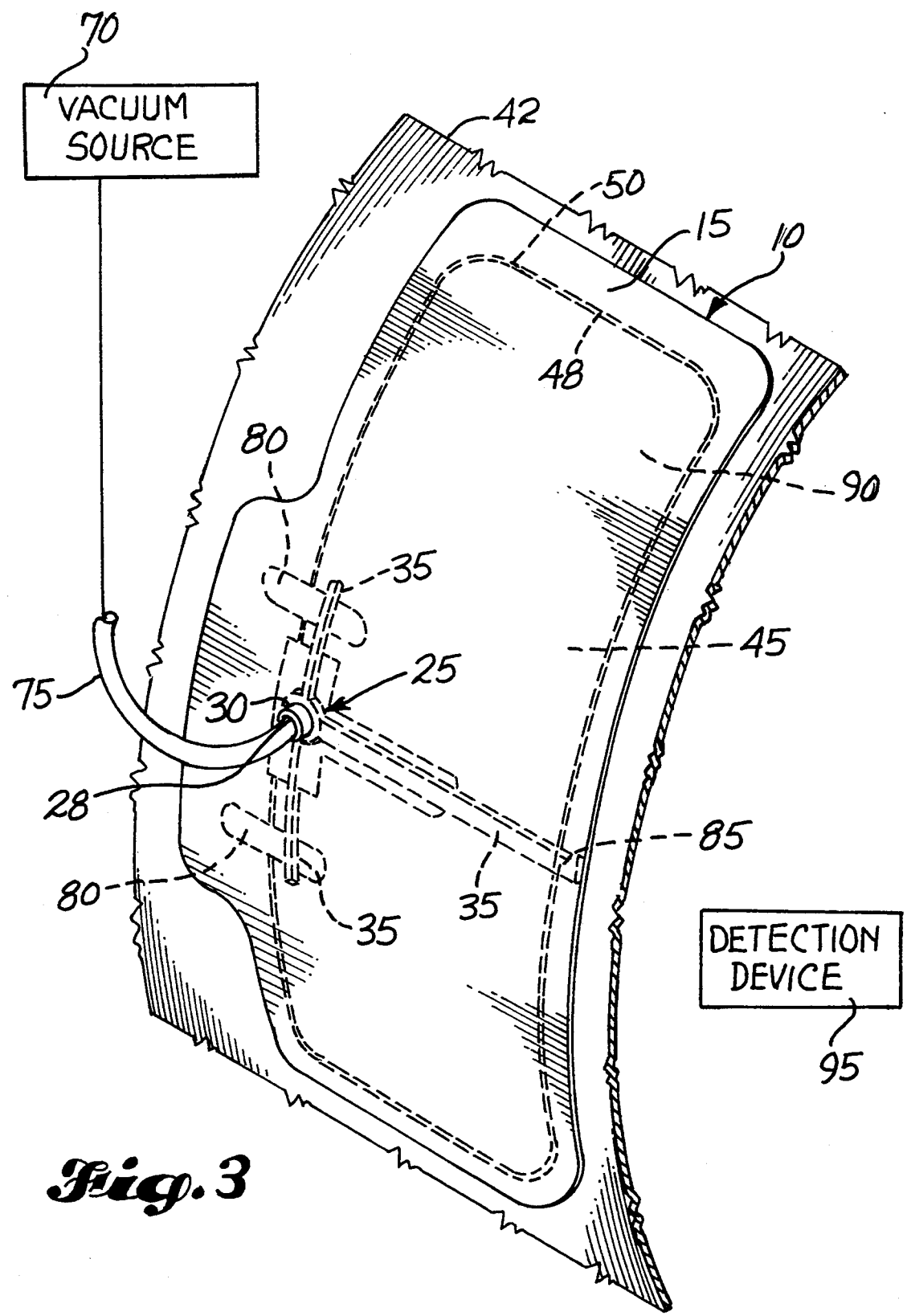
FIG. 3 is an isometric view of a vacuum test tool installed over a door and the surrounding sealed gap.

FIG. 3 shows the structure of FIG. 2 with a vacuum test tool 10 in place over gap 50. Vacuum test tool 10 is used in the preferred embodiment to test the integrity of a seal within gap 50 as follows. Vacuum source 70 is attached to vacuum test tool 10 by attachment means 30 receiving connecting hose 75. Vacuum source 70 may be a portable pump, a static floor vacuum system, or any other method for creating a sufficient suction.

Vacuum test tool 10 is positioned over an insert 45 such that the insert 45, associated gap 50, and seal (not shown) are overlapped or covered by sheet 15. In addition, sheet 15 is positioned such that the attached vacuum distribution channels or tubes 35 extend from vacuum inlet area 28 and intersect gap 50. The purpose of the intersection is to evacuate air out of the entire gap, thereby creating a vacuum against the seal and to suck sheet 15 securely against the structure 42. The resulting vacuum uniformly distributed under the entire sheet 15 holds the test tool 10 in place. As a result, the vacuum creates a pressure differential across the seal being tested.

In the case of a hinged insert 45, such as a door or hatch, distribution means 35 intersect the larger hinge gaps 80 and the gap 85 of the insert, thereby maximizing air evacuation to create a sufficient vacuum under sheet 15.

After a proper vacuum has been established along gap 50, a leak detection device 95 is used to detect pressure disturbances across the seal in gap 50. A pressure disturbance, such as air flow across the seal, creates an airwave or 'noise' which generally has a frequency in the sonic or ultrasonic range. Thus, the presence of a leak may be detected by a user listening through a listening tube or by an ultrasonic tester (not shown) brought to close proximity of gap. In the preferred embodiment, an ultrasonic tester detects the general location of a seal leak, thereafter a listening tube is used by an operator to pinpoint any leaks for repairs.

Once any or all pressure disturbances across the seal have been identified or located, the vacuum test tool 10 is removed from the structure 42 by disconnecting the vacuum source 70, thereby terminating the vacuum. Without the vacuum, sheet 15 and attached plenum 25 slides, falls, or is lifted off the structure 42. Test tool 10 may then be rolled up and stored in a suitable location until needed.

Figure 4:
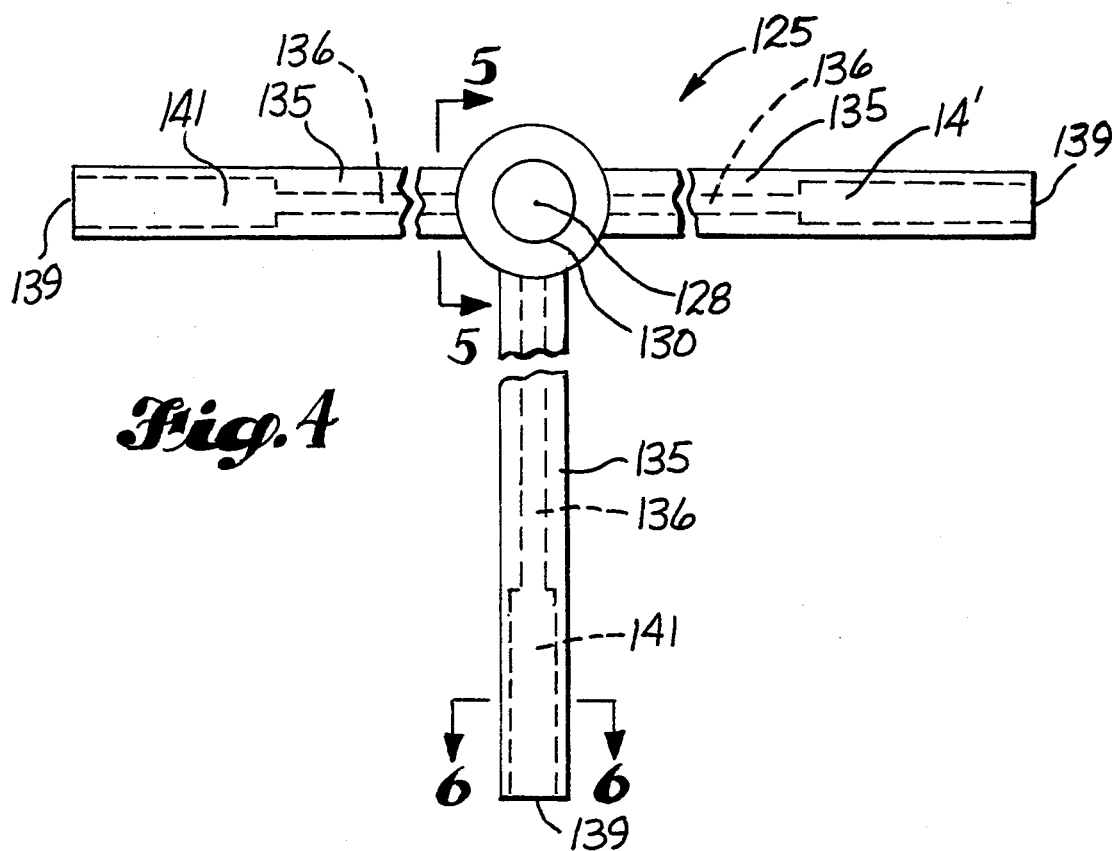
FIG. 4 is a top plan view of a vacuum plenum.

The vacuum plenum 125, as shown in FIG. 4, is a flexible molded rubber unit. Vacuum inlet area 128 is surrounded by a flexible attachment means 130 that receives a vacuum source connection hose (not shown). Vacuum distribution means 135, that branch outward from the vacuum inlet area 128, have axially aligned passageway 136 extending therethrough to outer end 139.

Figures 5, 6:
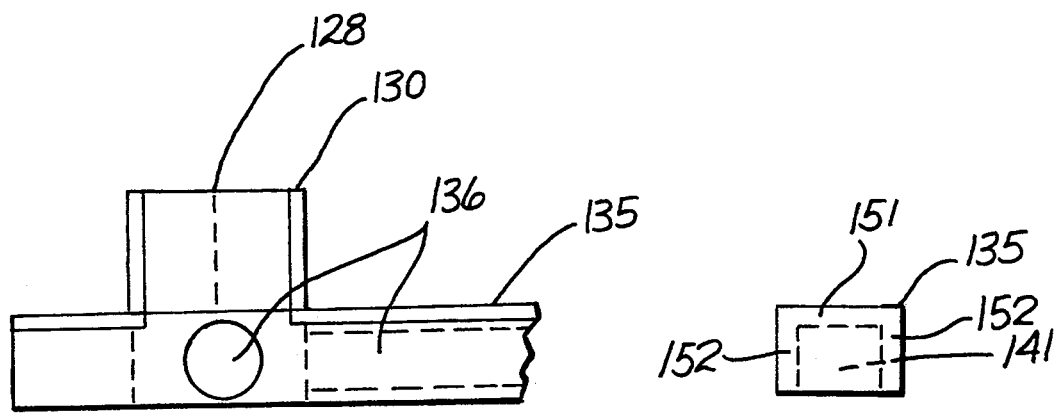
FIG. 5 is a partial cross section view of FIG. 4 taken across line 5—5 thereof.
FIG. 6 is a cross section view of FIG. 4 taken across line 6—6 thereof.

As seen in FIG. 5, the preferred embodiment of passageway 136 has approximately a one-half inch diameter circular cross section at the intersection with vacuum inlet area 128. At a predetermined position along vacuum distribution means 135 the cross sectional shape of passageway 136 transitions to an open square channel 141 shape, as shown in FIG. 6, with a top 151 and sides 152, but no bottom. Thus, open channel 141 directly interfaces with the structure and insert (not shown) for proper vacuum distribution under sheet 15.

Figure 7:
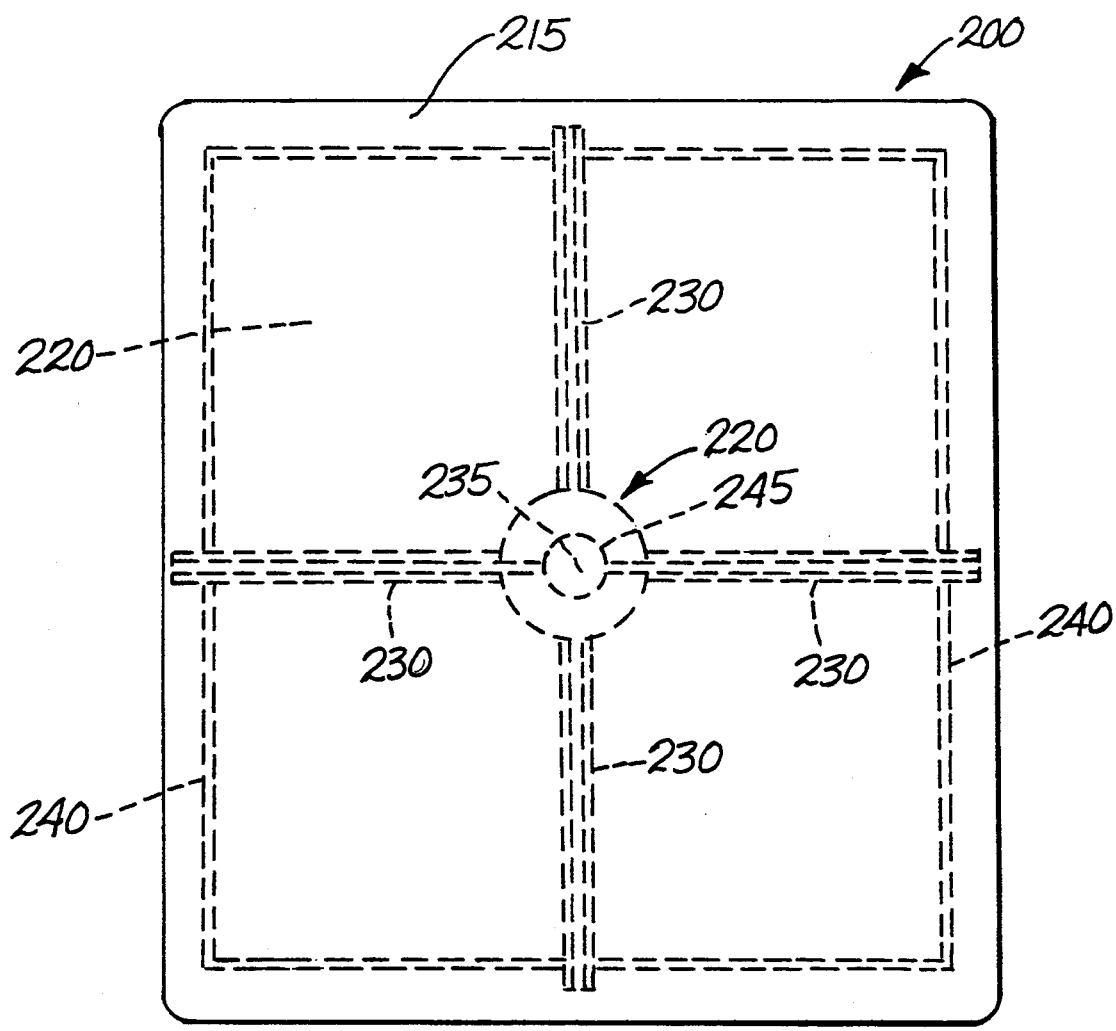
FIG. 7 is a top plan view of a vacuum test tool for a square insert and associated surrounding sealed gap.

In an alternative embodiment of the subject invention, as seen in FIG. 7, a vacuum test tool 200 comprises a vacuum plenum 220 adhered with adhesive to an air impervious, elastomeric seal sheet 215. This sheet 215 may be shaped and sized to fit over various inserts including a window insert 220. Vacuum distribution means 230 branch out from vacuum inlet area 235 and intersect the gap 240 between structure 235 and insert 220. A vacuum source (not shown) attaches to vacuum plenum 220 by press fitting a connecting hose (not shown) into mating attachment means 245.

Use of vacuum test tool 200 is similar to the method described above. The manner of pressure disturbance detection across the seal in gap 240 as well as the removal of test tool 200 from structure 215 is similar to the above discussion.

In summary, the present invention allows for detection of a leak or pressure disturbance across a seal in a sealed gap, thereby facilitating necessary repairs at an early point in production or maintenance. Thus, in large areas subject to pressurization, seals or seams may be tested before the entire structure is ready for a "full blow" test. In addition, after completion of a seal test utilizing the subject invention, the testing apparatus is removed simply by terminating the vacuum force, thereby allowing the vacuum tool to fall away from or be lifted from the structure. The testing apparatus may then easily be rolled up and stored in an appropriate location.

While a preferred embodiment of the invention has been described, it will be apparent to persons skilled in the art to which this invention pertains that many modifications and variations thereto are possible without departing from the spirit and scope of the invention.

Accordingly, the scope of this invention should be considered limited only by the spirit and scope of the elements of the appended claims or their reasonable equivalence.

We claim:

1. A portable testing apparatus to detect air leaks across a sealed gap comprising:
an elastomeric, air impervious sheet sized and shaped to overlap a gap between an opening in a structure and an insert for said opening, said sheet having an inside surface capable of forming a vacuum seal between said inside surface and said structure;
a vacuum plenum attached to said sheet said plenum comprising a flexible molded rubber plenum adhered with adhesive means to said inside surface of said sheet such that said molded rubber plenum may interface with said gap, said plenum extending through and sealing with said sheet;

means for attaching said plenum to a vacuum source, channels extending from said plenum along said inside surface of said sheet having openings therein for uniformly distributing and drawing a vacuum between said sheet and said structure and through said gap; and means for detecting the passage of air through said gap when said vacuum is drawn therethrough.

2. The portable testing apparatus of claim 1, said means for detecting the passage of air further comprising a listening tube whereby an operator may listen for air flow through a leak in a said sealed (across said seal in said) gap.

3. The testing apparatus of claim 1, said means for detecting the passage of air further comprising an ultrasonic tester unit to detect ultrasonic disturbances caused by air flow through a leak in a said sealed (across said seal in said) gap.

4. A portable testing apparatus to detect pressure disturbance across a sealed gap comprising:

an elastomeric, air impervious sheet sized and shaped to overlap a gap between an opening in a structure and an insert for said opening, said sheet having an inside surface capable of forming a vacuum seal between said inside surface and said structure;

a vacuum plenum attached to said sheet said plenum comprising a flexible molded rubber olenum adhered with adhesive means to said inside surface of said sheet such that said plenum interfaces with said sealed gap, said plenum extending through and sealing with said sheet;

means for attaching said plenum to a vacuum source, channels extending from said plenum along said inside surface of said sheet having openings therein for uniformly distributing and drawing a vacuum between said sheet and said structure and through said gap; and means for detecting a pressure disturbance across said gap when said vacuum is drawn therethrough.

5. The portable testing apparatus of claim 4, said means for detecting a pressure disturbance further comprising a listening tube whereby an operator may listen for pressure disturbance across said seal.

6. The portable testing apparatus of claim 4, said means for detecting a pressure disturbance further comprising an ultrasonic tester unit to detect ultrasonic disturbances (across said seal) caused by air flow through a leak in a said sealed gap.

7. A method of detecting air leaks across a sealed gap comprising:

attaching a vacuum source to a vacuum test tool, said vacuum test tool comprising i) an elastomeric, air impervious sheet sized and shaped to overlap a gap between an opening in a structure and an insert for said opening, said gap containing a seal therein, said sheet having an inside surface capable of forming a vacuum seal between said inside surface and said structure, ii) a vacuum plenum attached to said sheet said plenum comprising a flexible molded rubber plenum adhered with adhesive means to said inside surface of said sheet such that said molded rubber plenum may interface with said gap, said plenum extending through and sealing with said sheet, iii) means for attaching said plenum to a vacuum source, and iv) channels extending from said plenum along said inside surface of said sheet having openings therein for uniformly distributing and drawing a vacuum between said sheet and said structure and through said gap, placing said air impervious sheet over said sealed gap such that said sheet fully overlaps said gap;

positioning said sheet such that said channels intersect said gap such that air in said gap is evacuated, thereby drawing a vacuum against said seal; and locating pressure disturbances across said seal by means for detecting a pressure disturbance across said gap when said vacuum is drawn therethrough.

8. The method of claim 7, wherein said means for detecting a pressure disturbance across said gap comprises (said detection means comprising) an ultrasonic tester (to detect ultrasonic disturbances across said seal).

9. The method of claim 7, said means for detecting a pressure disturbance further comprising a listening tube whereby an operator may listen for and hear pressure disturbance across said seal.

* * * * *